(Model.)
M. A. MOREHOUSE.
THERAPEUTIC BATTERY.
No. 373,088. Patented Nov. 15, 1887.
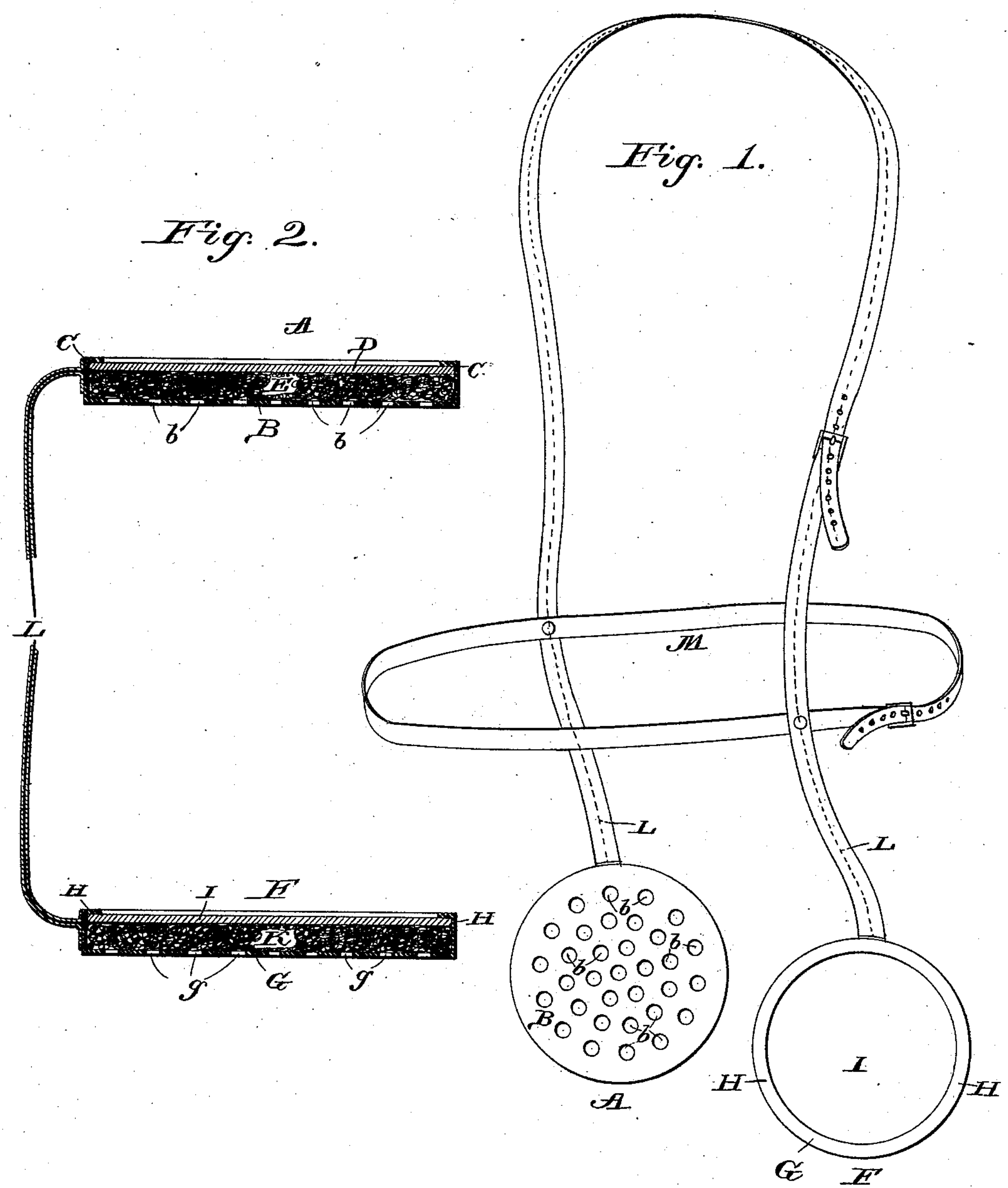
Witnesses
Percy C. Bowen.
J. C. Garner
Inventor.
Miles A. Morehouse;
By his Attorneys
C. A. Snow & Co
N. PETERS, Photo-Lithographer, Washington, D. C.

UNITED STATES PATENT OFFICE.

MILES A. MOREHOUSE, OF JOHNSBURG, NEW YORK.

THERAPEUTIC BATTERY.

SPECIFICATION forming part of Letters Patent No. 373,088, dated November 15, 1887.

Application filed July 20, 1886. Serial No. 208,553. (Model.)

*To all whom it may concern:*

Be it known that I, MILES A. MOREHOUSE, a citizen of the United States, residing at Johnsburg, in the county of Warren and State of New York, have invented a new and useful Improvement in Therapeutic Batteries, of which the following is a specification.

My invention relates to an improvement in therapeutic batteries; and it consists in the peculiar construction and combination of devices, that will be more fully set forth hereinafter, and particularly pointed out in the claims.

In the accompanying drawings, Figure 1 is a perspective view of a therapeutic battery embodying my improvements. Fig. 2 is a vertical sectional view of the electrodes of the battery.

A represents an inclosing-case composed of a circular disk of copper, B, having its edges C turned at right angles from the face of the disk and bent over a disk of card-board, D, or other suitable dielectric which forms the back of the case. The disk B is provided with perforations *b*, and the space in the case between the said disk and the back is filled with a suitable absorbent material, as at E. The copper disk forms one element of the battery.

F represents a similar inclosing-case composed of a circular disk of zinc, G, having its edges H turned at right angles and bent over the rear side of a disk of card-board, I, or other suitable dielectric, which forms the back of the case. The disk G is provided with perforations *g*, and in between the said disk and the back of the case is a suitable absorbent, K. The zinc disk G forms the other element of the battery.

L represents an insulated conducting-wire, which has one end attached to the disk B and the other end attached to the other disk, G. The said conductor passes over the shoulder of the patient, so as to suspend one of the cases on one side or back of the body over the kidneys, and the other case over the liver or on the stomach. A belt, M, passes around the body of the patient and secures the cases in position, with the zinc and copper elements in contact with the skin.

Heretofore in this class of batteries it has been the practice to saturate the absorbent fillings with an exciting-acid before applying the battery to the body of the patient. My battery has its cases containing the zinc and copper elements placed in contact with the body of the patient; but no exciting-acid is put in the said cases. The moisture from the body enters the cases through the perforations and becomes absorbed by the absorbent fillings, thus saturating the latter and setting up electrical action in the battery, the current passing from the copper element through the conductor to the zinc element, and from thence directly back to the copper element through the body of the patient.

Having thus described my invention, I claim—

1. The combination, in electric body-wear, of the two inclosing-cases having the absorbent fillings, one of said cases having a perforated face-plate forming the positive element of the battery, and the other of the said cases having a perforated face-plate forming the negative element of the battery, said plates being adapted to come in contact with the body of the patient, and the single insulated conductor connecting the positive element in one case with the negative element in the other case, whereby the return electric current will be caused to pass through the body of the wearer, substantially as described.

2. The combination of the cases A and F, comprising the perforated metallic disks forming the elements of the battery, the edges of the said disks being bent at right angles, the dielectric backs secured to the right-angled edges of the disks, the absorbent fillings in the cases, and the insulated conductor connecting the metallic disks or elements of the cases, substantially as described.

In testimony that I claim the foregoing as my own I have hereto affixed my signature in presence of two witnesses.

MILES A. MOREHOUSE.

Witnesses:

JAMES N. SPOOR,
PHILIP MORTON.